(12) United States Patent
Bombeck et al.

(10) Patent No.: US 9,072,404 B2
(45) Date of Patent: Jul. 7, 2015

(54) METHOD FOR ENABLING COMPLEX ORDER SPECIFICATIONS TO A HOT BEVERAGE BREWING SYSTEM

(76) Inventors: Khristian Bombeck, Bozeman, MT (US); Shoshana Loeb, Dallas, TX (US)

(*) Notice: Subject to any disclaimer, the term of this patent is extended or adjusted under 35 U.S.C. 154(b) by 66 days.

(21) Appl. No.: 13/596,866

(22) Filed: Aug. 28, 2012

(65) Prior Publication Data
US 2013/0156903 A1    Jun. 20, 2013

Related U.S. Application Data

(63) Continuation-in-part of application No. 13/403,095, filed on Feb. 23, 2012, now Pat. No. 8,739,689.

(60) Provisional application No. 61/561,684, filed on Nov. 18, 2011, provisional application No. 61/447,009, filed on Feb. 26, 2011.

(51) Int. Cl.
*A47J 31/30* (2006.01)
*A47J 31/20* (2006.01)

(52) U.S. Cl.
CPC . *A47J 31/30* (2013.01); *A47J 31/20* (2013.01)

(58) Field of Classification Search
CPC ............. A23F 3/00; A23F 5/24; G06Q 30/00; G06Q 3/048
USPC .......................... 426/431, 433, 231; 700/233
See application file for complete search history.

(56) References Cited

U.S. PATENT DOCUMENTS

| | | | | |
|---|---|---|---|---|
| 1,706,190 A | * | 3/1929 | Shroyer | 99/285 |
| 2,576,432 A | * | 11/1951 | Wilcox | 99/281 |
| 2,660,947 A | * | 12/1953 | Forschner | 99/282 |
| 2,784,678 A | | 3/1957 | Graham | |
| 3,691,933 A | * | 9/1972 | Martin | 99/282 |
| 4,498,375 A | | 2/1985 | Bedini | |
| 4,843,954 A | * | 7/1989 | Henn | 99/292 |
| 4,876,953 A | | 10/1989 | Imamura et al. | |
| 4,922,809 A | * | 5/1990 | Fuhner | 99/283 |
| 5,339,725 A | | 8/1994 | De'Longhi | |
| 5,902,620 A | | 5/1999 | Nolan | |
| 6,250,208 B1 | | 6/2001 | Helps et al. | |
| 6,253,667 B1 | | 7/2001 | Lussi et al. | |
| 6,339,985 B1 | | 1/2002 | Whitney | |

(Continued)

FOREIGN PATENT DOCUMENTS

DE    19545111       *  6/1997
WO  PCT/US2012/026451    2/2012

OTHER PUBLICATIONS

Bonn-O-Matic Corporation advertisement; trifecta®; URL: http://www.bunnathome.com.products/trifecta; Printed from web site on Mar. 6, 2012.

*Primary Examiner* — Anthony Weier

(57) ABSTRACT

In described embodiments, a hot liquid extraction system includes a brew chamber having a brew chamber upper end and a brew chamber lower end. A steam chamber is disposed below the brew chamber. The steam chamber has a steam chamber upper end, a steam chamber lower end in fluid communication with the brew chamber, and a fluid inlet. A filtering base is removably inserted into the brew chamber. A boiler has a first steam outlet in fluid communication with the fluid inlet and a second outlet in fluid communication with the fluid inlet. A fresh water supply conduit is in fluid communication with boiler and with the fluid inlet. A method of brewing a beverage is also included.

18 Claims, 9 Drawing Sheets

(56) References Cited

U.S. PATENT DOCUMENTS

| | | | |
|---|---|---|---|
| 6,481,339 B1 | 11/2002 | Castleberry | |
| 6,708,599 B2 | 3/2004 | Torigai et al. | |
| 7,104,185 B2 | 9/2006 | Leung et al. | |
| 7,228,066 B2 | 6/2007 | Pope | |
| 7,483,964 B1 * | 1/2009 | Jackson et al. | 709/221 |
| 7,673,555 B2 | 3/2010 | Nosler et al. | |
| 8,522,668 B2 * | 9/2013 | Kirschner et al. | 99/279 |
| 8,739,689 B2 * | 6/2014 | Bombeck et al. | 99/293 |
| 2007/0295217 A1 * | 12/2007 | Haileselassie | 99/279 |
| 2008/0050480 A1 * | 2/2008 | Doglioni Majer | 426/231 |
| 2008/0201241 A1 * | 8/2008 | Pecoraro | 705/27 |
| 2010/0268378 A1 * | 10/2010 | Sharpley | 700/233 |
| 2012/0156337 A1 * | 6/2012 | Studor et al. | 426/231 |
| 2012/0156339 A1 * | 6/2012 | Studor et al. | 426/231 |
| 2012/0156344 A1 * | 6/2012 | Studor et al. | 426/433 |
| 2013/0220137 A1 * | 8/2013 | Bombeck et al. | 99/287 |
| 2013/0263745 A1 * | 10/2013 | Bombeck et al. | 99/293 |
| 2014/0227413 A1 * | 8/2014 | Bombeck et al. | 426/431 |

* cited by examiner

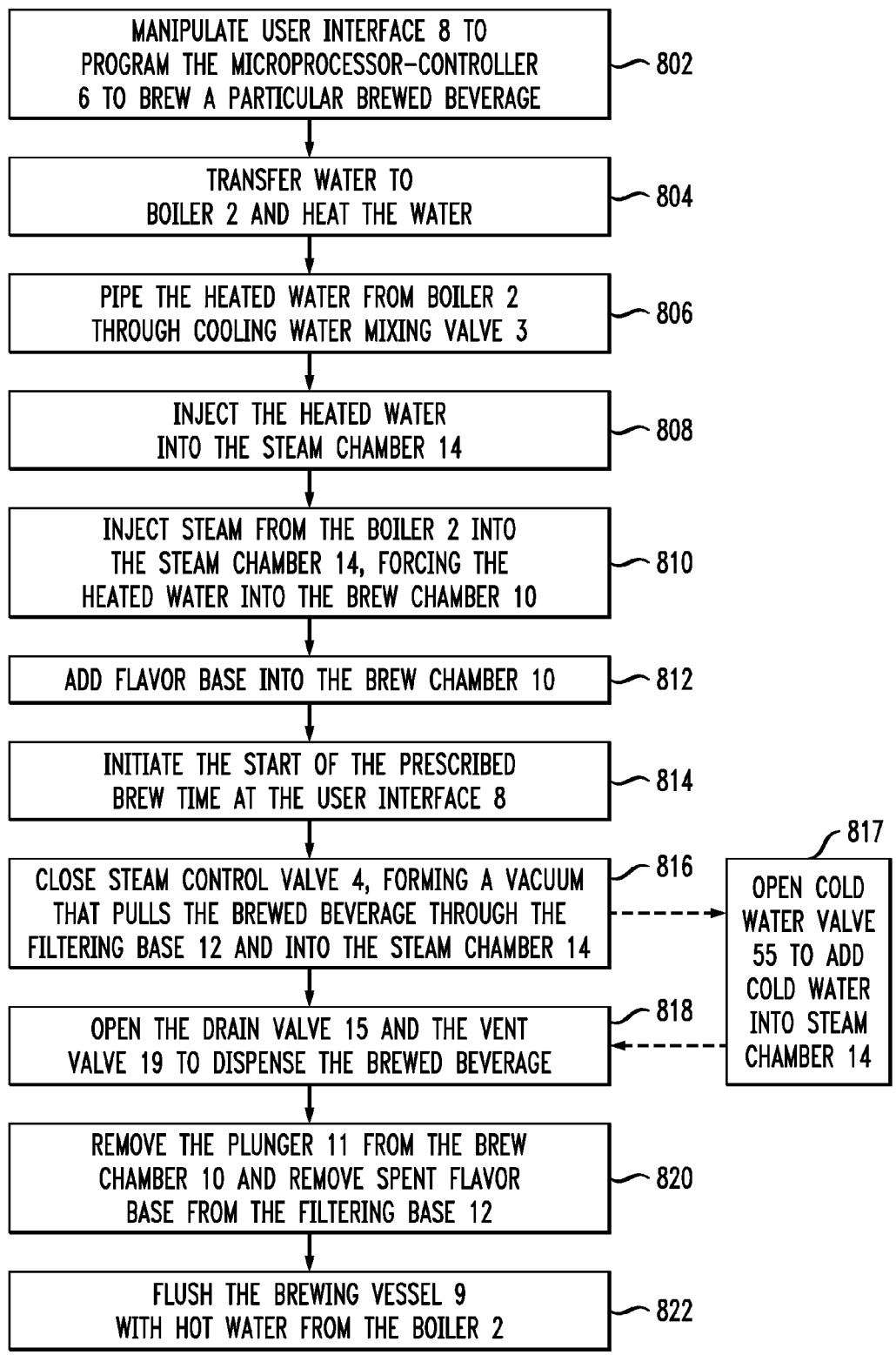

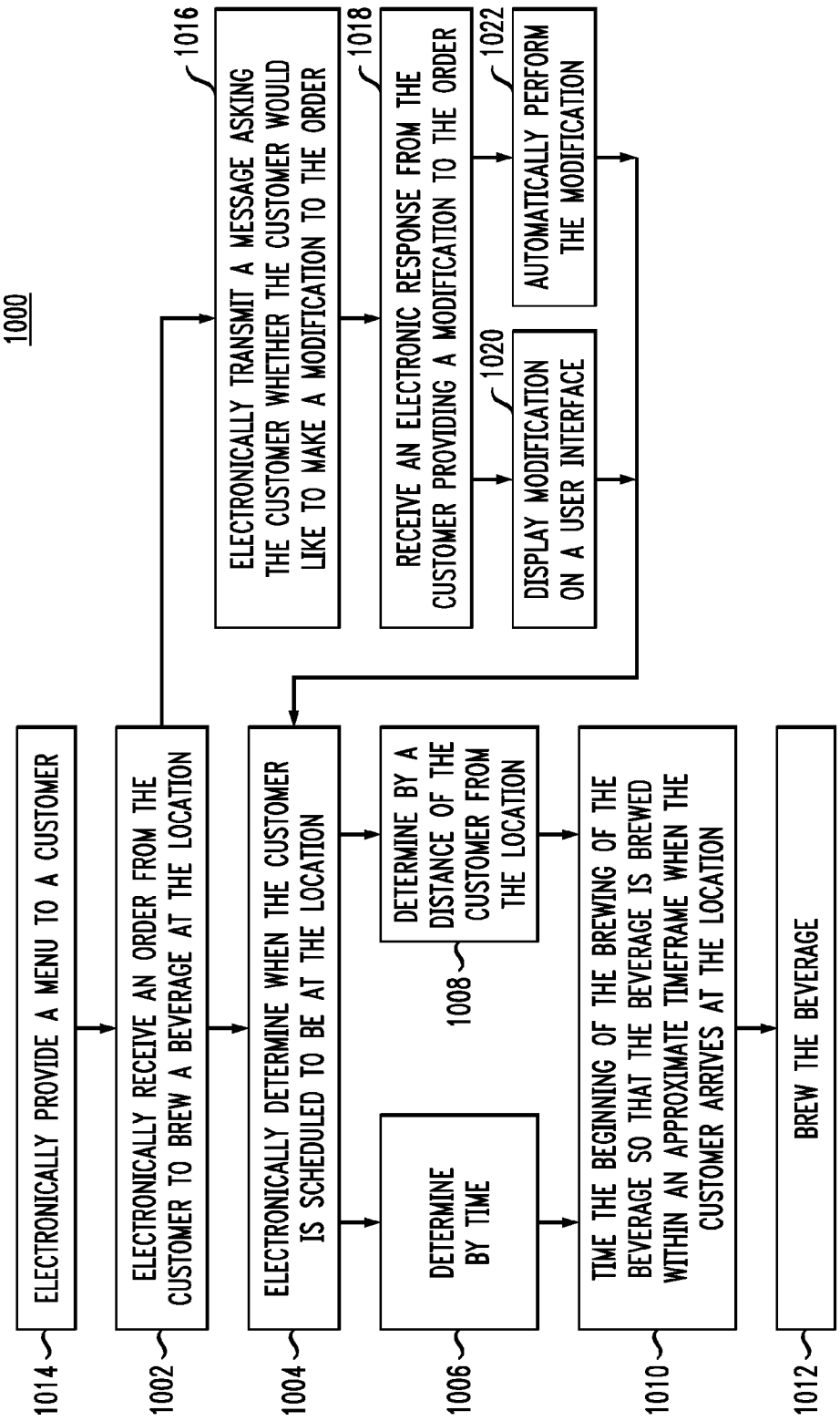

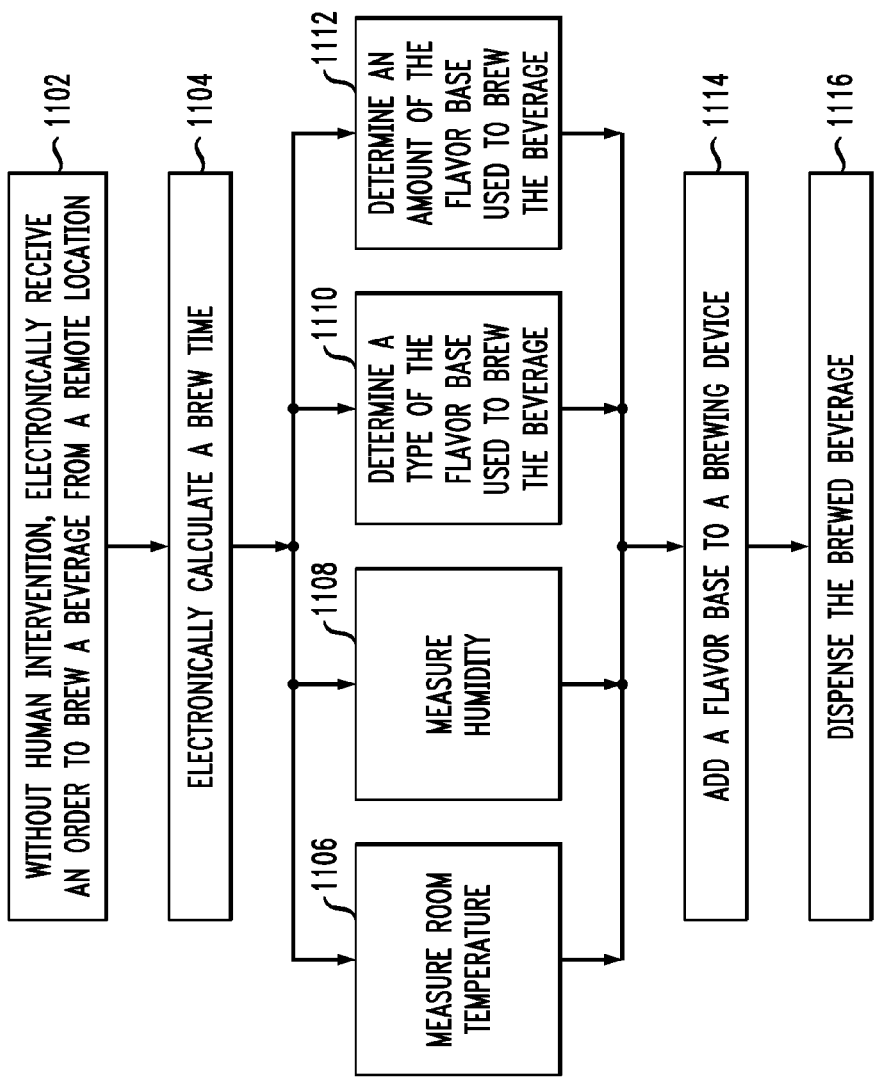

METHOD FOR ENABLING COMPLEX
ORDER SPECIFICATIONS TO A HOT
BEVERAGE BREWING SYSTEM

CROSS-REFERENCE TO RELATED APPLICATIONS

This application claims the benefit of U.S. provisional application No. 61/561,684, filed on Nov. 18, 2011 and is a Continuation-in-Part application of U.S. patent application Ser. No. 13/403,095, filed on Feb. 23, 2012 now U.S. Pat. No. 8,739,689, which claims the benefit of the filing date of U.S. provisional application No. 61/447,009, filed on Feb. 26, 2011, the teachings of which are incorporated herein by reference in their entireties.

BACKGROUND OF THE INVENTION

1. Field of the Invention

The present invention relates to an apparatus for brewing a beverage.

2. Description of the Related Art

A typical siphon coffee maker brews coffee using two chambers where vapor pressure and vacuum produce coffee. There have been many variations of this type of coffee maker, also known as vacuum pot coffee maker, siphon coffee maker and vacuum coffee maker. Similar systems can be used for brewing other liquids by extraction into hot liquid.

U.S. Pat. No. 7,673,555 discloses a machine for brewing a beverage that uses a mechanically operated piston to force a brewed beverage through filter for dispensing. The piston moves in an upward direction, forcing the beverage, which is in a closed volume, through check valves in the piston and to a volume below the piston for dispensing to a user. Drawbacks to this type of machine include added costs for the mechanically operated piston, as well as the potential for the piston to jam, thereby rendering the machine useless.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a machine for brewing a beverage. The machine includes a brew chamber having a brew chamber upper end and a brew chamber lower end. A steam chamber is disposed below the brew chamber. The steam chamber has a steam chamber upper end, a steam chamber lower end in fluid communication with the brew chamber, and a fluid inlet. A filtering base is removably inserted into the brew chamber. A boiler has a first steam outlet in fluid communication with the fluid inlet and a second outlet in fluid communication with the fluid inlet. A fresh water supply conduit is in fluid communication with boiler and with the fluid inlet.

Further, the present invention provides a method of brewing a beverage. The method provides electronically receiving an order from a customer to brew a beverage at a location; electronically determining when the customer is scheduled to be at the location; timing the beginning of the brewing of the beverage so that the beverage is brewed within an approximate timeframe when the customer arrives at the location; and brewing the beverage.

Additionally, the present invention provides another method of brewing a beverage. The method provides electronically receiving an order to brew a beverage from a remote location; electronically calculating a brew time; adding a flavor base to a brewing device; brewing the beverage; and dispensing the brewed beverage.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows a flow chart illustrating an exemplary operation of the machine disclosed here and depicted in FIGS. 1-7C;

FIG. 10 is a first flowchart illustrating an exemplary method of brewing a beverage according to the present invention; and FIG. 11 is a second flowchart illustrating an additional exemplary method of brewing a beverage according to the present invention.

DETAILED DESCRIPTION

Figure 1:
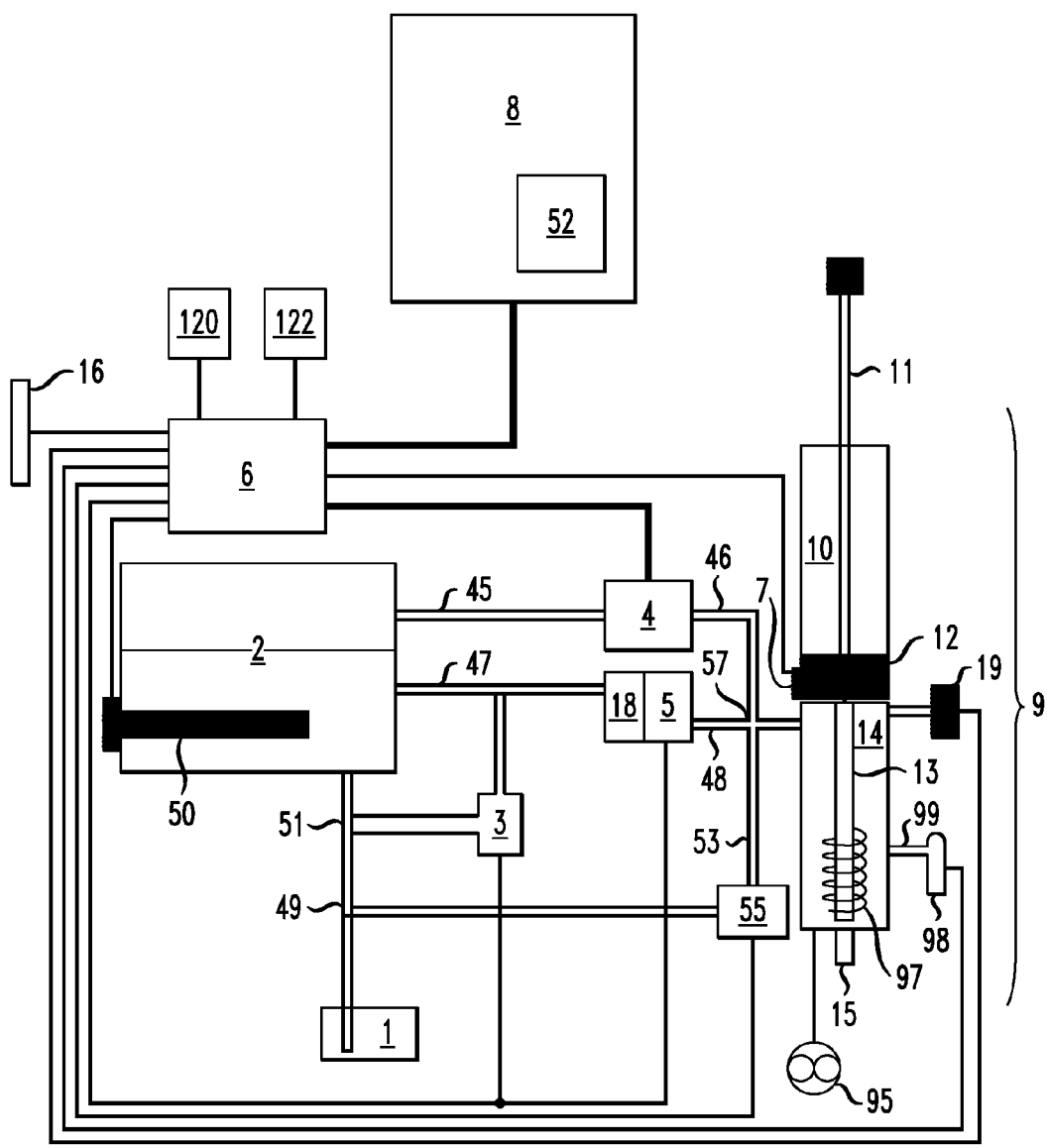
FIG. 1 shows a block diagram of a machine for brewing beverages such as coffee or tea or according to an exemplary embodiment of the invention.

A typical, non-limiting embodiment of the present invention includes a machine for brewing a beverage such as, but not limited to, coffee or tea, that includes a brew vessel and a plunger disposed in the brew vessel. The brew vessel is operable to receive a liquid such as water, a flavor base such as ground coffee or tea, and to allow the beverage to brew from a mixture of the liquid and the base. The plunger assembly is operable to filter a solid, such as spent coffee grounds or tea from the brewed beverage and to remove the spent flavor base from the brew vessel. Steam pressure from an external boiler is operable to power a siphon brewer which relatively decreases the time traditionally required to brew siphon beverages, and introduces a new means to control many factors of the brew cycle. Regulation of steam pressure controls agitation of the brewing liquid, and might be employed to terminate the brewing process. Valves, either manual or electric, are used to precisely control the flow of water and steam from the boiler. The precise control of these valves provides for accurate achievement of the brew temperature, brew time, brew volume, and brew agitation. A valve on the bottom of the brew vessel allows liquid to drain from the brew vessel. In some embodiments, brewing automation is provided by means of a user interface through which a microprocessor is controlled. The microprocessor controls the water valve and the steam valve to achieve unique brew settings for each brew vessel.

The microprocessor also controls additional brewing parameters, including, but not limited to, brew duration, brew temperature, agitation, coarseness of coffee, milk temperature, proportion of flavor base to brewing liquid, as well as brew start time. A user, such as a barista may operate the machine according to various parameters to obtain an optimally desired brewed beverage. Additionally, the inventive device might find possible errors in brew settings and communicate with the user about possible corrections, such as changing the coarseness of the coffee or the brew time. Further, the system might include a library of recommended settings and information for the user to browse as well as recommend to the user new settings that are consistent with a desired taste.

Referring in general to FIGS. 1-7C, this discussion is of the embodiment of machine 17 for brewing beverages that further develops the well-known art of siphon brewing. Furthermore, this machine 17 may provide a new level of precision, customization, and efficiency to the siphon brewing method. The embodiment of this machine 17 uses boiler 2 with heat exchange technology, although heat exchangers are not necessary, to power one or many siphon style brew vessel 9. To separate the beverage from the flavor base, inventive machine 17 uses plunger 11 with filtering base 12 similar in configuration to the plunger apparatus used by the well-known French press brew method. However, in contrast to the French press method, with the present invention, the spent flavor base is left atop the plunger's filter base 12.

Furthermore, boiler 2 is employed to preheat the water for each brew. Flow meter 5 and valves 4, 18 initiate and control the brew process with a relatively high degree of precision. Steam from the boiler 2 is used to generate pressure, which forces water in the brew vessels' steam chamber 14 upward into the brew chamber 10 of the brew vessel 9. The steam pressure from boiler 2 is then controlled with valve 4 in order to heat the brew water in the brew chamber 10 to a user's specified temperature. The incoming steam pressure is further regulated to maintain the desired brew temperature, control agitation of the brewing liquid, and to terminate the brewing process.

In order to reduce brewing time, in an exemplary embodiment, boiler 2 heats water inside boiler 2 to a saturated steam state. In this state, steam is in equilibrium with heated water at the same pressure. Alternatively, in another exemplary embodiment, boiler 2 heats water to a dry steam state. Still alternatively, another exemplary embodiment, boiler 2 heats water to a superheated state. In any of the above-disclosed steam states, the steam reduces the brewing time of liquid in brew chamber 10.

Machine 17 allows for automation of one or all steps of the siphon brewing technique. Such a machine may control one or more of the brewing parameters with a level of precision that yields brewed coffee having a customizable taste from cup to cup. Furthermore, such a machine may siphon brew with a speed and efficiency that renders the machine suitable for use in a high volume commercial settings. In addition, such a machine may allow one to easily change the brewing recipe from brew to brew, where the recipe may be customized by a customer to the customer's preferences.

The embodiment of this machine may include but is not limited to one or more of the following components: brew vessel 9, boiler 2, temperature sensor 7, flow meter 5, steam control valve 4, water control valve 18, cooling water mixer valve 3, microprocessor-controller 6, user interface 8, fresh water inlet valve 1, and network communication port 16.

Figure 2:
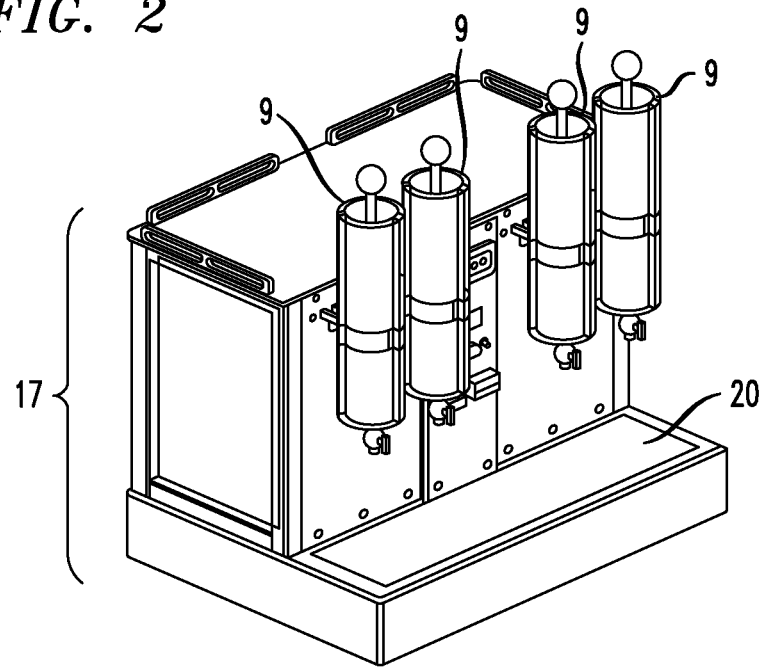
FIG. 2 shows a front perspective view of the same embodiments of the invention disclosed here as depicted in FIG. 1.
Figure 3:
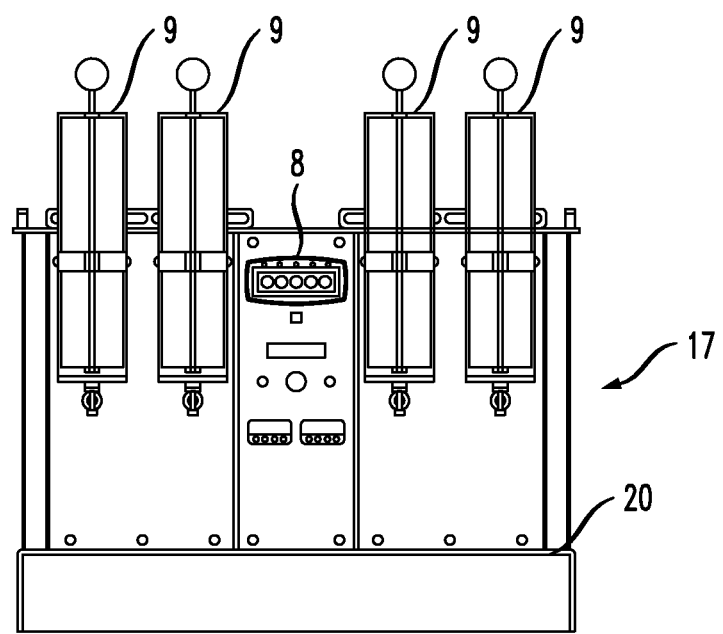
FIG. 3 shows an front elevation view of the machine disclosed here and as depicted in FIG. 2.
Figure 4:
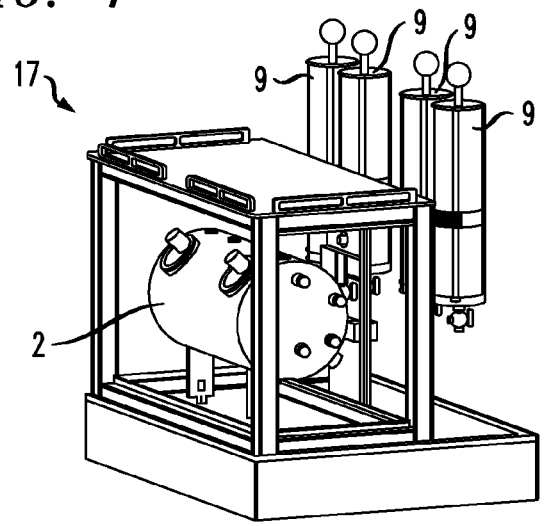
FIG. 4 shows a rear perspective view of the machine disclosed here and as depicted in FIG. 2.

While, as shown in FIGS. 2-4, up to four of brew vessel 9 may be used with machine 17, those skilled in the art will recognize that more or less than four brew vessels 9 might be incorporated into machine 17. Each brew vessel 9 may be used simultaneously brew multiple but distinct cups of a beverage, each with its own set of brewing parameters. For ease of description, only a single brew vessel 9 will be discussed.

Figure 5:
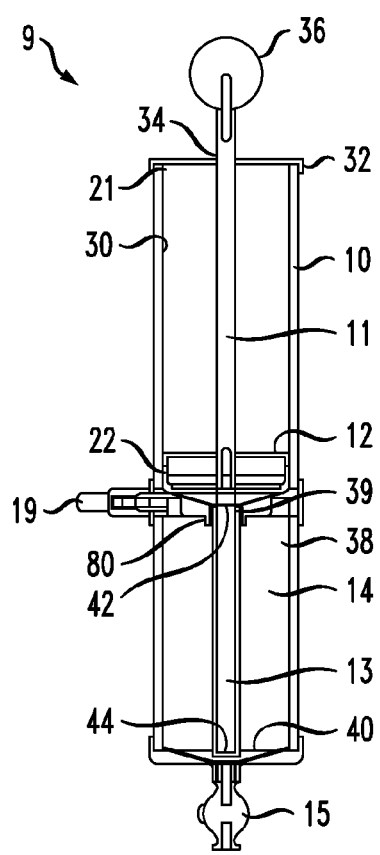
FIG. 5 shows a sectional view of a brew vessel used in the machine disclosed here and as depicted in FIG. 1.

Referring specifically to FIG. 5, brew vessel 9 includes an upper, or brew, chamber 10 having an upper end 21 and a lower end 22. In an exemplary embodiment, brew vessel 9 might have approximate volume of about 20 ounces. Filtering base 12 is coupled to elongated plunger 11 and is removably inserted into brew vessel 9. Filtering base 12 receives and retains a flavor base, such as, for example, coffee grounds or tea leaves. In an exemplary embodiment, shown in FIG. 6, filtering base 12 includes between about 1 and about 10 layers of filter media, which can be constructed from a wire mesh or otherwise porous metal having, pore sizes of between about 0.005 and about 0.125 inches in diameter.

Filtering base 12 may include a plurality of spokes 24 extending outwardly from plunger 11 to at least one annular frame 26. Openings 28 between the spokes 24 allow the brewing liquid to pass through filtering base 12. The filter media, however, prevents the flavor base from passing downward below filtering base 12. Annular frame 26 and filtering base 12 form an open reservoir to receive and retain the flavor base and to prevent solid elements of the flavor base from escaping from the brew chamber 10 during and after the brewing process.

Figure 6:
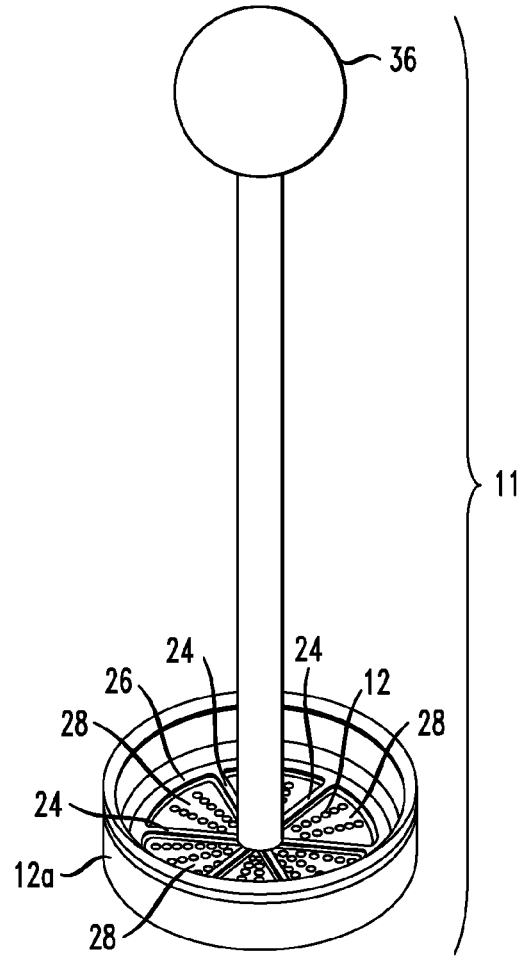
FIG. 6 shows a perspective view of a plunger used in the machine disclosed here and as depicted in FIG. 1.

Referring specifically to FIG. 5, filtering base 12 is movable through the brew chamber 10 between the lower end 22 in an operational mode and the upper end 21 in a cleaning mode. Filtering base 12 is sized so that, while being easily movable between the lower end 22 and the upper end 21, the outer perimeter of the filtering base 12 snugly engages the inner sidewall 30 of the brew chamber 10 so that the flavor-base or brewing water is substantially unable to leak or otherwise bypass filtering base 12 during the brewing process. The outer perimeter of filtering base 12 may include a lubricious material, such as, for example, TEFLON®, which facilitates a sliding, yet sealing, engagement of filtering base 12 with inner sidewall 30 of brew chamber 10. Alternatively, as shown in FIG. 6, filtering base 12 may include at least one O-ring 12a that extends around the perimeter of filtering base 12 and serves to seal filtering base 12 against inner sidewall 30 of brew chamber 10.

Figure 6A:
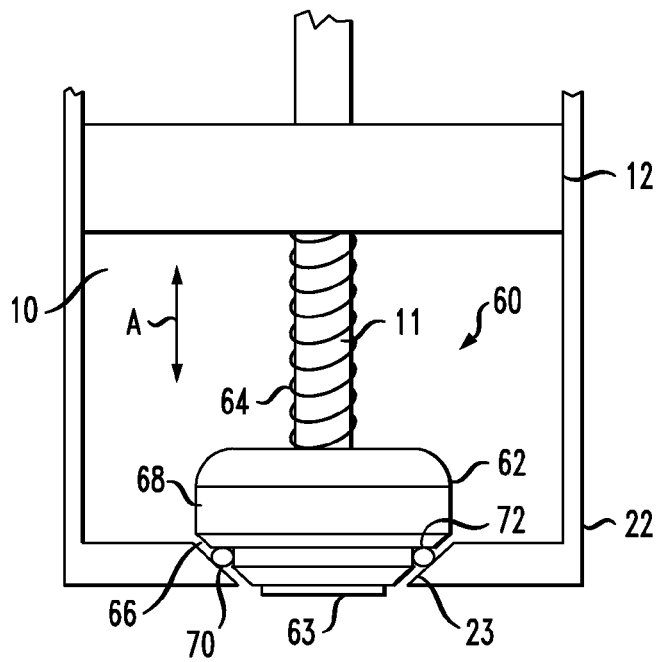
FIG. 6A shows a perspective view of a lower end of the plunger of FIG. 6.

Referring to FIG. 6A, check valve assembly 60 may be used at the bottom of filtering base 12 to seal lower end 22 of brew chamber 10. Check valve assembly 60 is adapted to operate between an open position wherein fluid passes between brew chamber 10 and steam chamber 14 and a closed position wherein fluid in brew chamber 10 is retained in brew chamber 10. Check valve assembly 60 includes valve 62 slidingly disposed around plunger 11 and moves along plunger 11 in the direction identified by arrow "A". Biasing member 64, such as, for example a helical spring, biases valve 62 away from filtering base 12 and toward lower end 22 of brew chamber 10. Lip 63 prevents valve 62 from falling off of plunger 11. When plunger 11 is fully lowered into brew chamber 10, valve 62 seals brew chamber 10 from steam chamber 14. Valve 62 includes sealing surface 66 that extends at about to 45° angle relative to a vertical surface 68 of valve 62. O-ring 70 extends around slot 72 formed in sealing surface 66 to enhance the sealing of valve 62 with lower end 22 of brew chamber 10. Lower end 22 of brew chamber 10 includes a tapered opening 23 into which sealing surface 66 seats when check valve assembly 60 is in the closed position.

Biasing member 64 is sized such that, when sufficient steam pressure from steam chamber 14 engages valve 62, biasing member 64 yields, thereby allowing the steam to push valve 62 upward along plunger 11 and allow the steam to enter brew chamber 10. When the steam pressure is released, biasing member 64 forces valve 62 downward along plunger 11, sealing brew chamber 10 and preventing any liquid in brew chamber 10 from flowing out of brew chamber 10 and into steam chamber 14.

Lid 32 is removably disposed over the upper end 21 of brew chamber 10. Lid 32 includes a centrally located opening 34 through which the plunger 11 extends. Lid 32 may rest on the brew chamber 10 by action of gravity or, alternatively, a locking mechanism, such as, for example, a threaded connection (not shown), may secure the lid 32 to the upper end 21 of brew chamber 10.

Plunger 11 is sufficiently long such that, when the filtering base 12 is disposed in the lower end 22 of the brew chamber 10, a significant length of plunger 11 extends outwardly from the upper end 21 of brew chamber 10 and through lid 32 so that a user may be able to grasp plunger 11 and lift plunger 11 and filter base 12 toward the upper end 21 of brew chamber 10. Optionally, plunger 11 might include device 36, such as a handle or knob, at an upper end thereof to facilitate grasping plunger 11.

Brew vessel 9 further includes lower, or steam, chamber 14 located physically below brew chamber 10. Steam chamber 14 includes an upper end 38 and a bottom end 40. In an exemplary embodiment, steam chamber 14 might have approximate volume of about 24 ounces. A conduit, such as straw 13, having a first, or top, open end 42 and a second, or bottom, open end 44, distal from the first open end 42, extends downward from lower end 22 of brew chamber 10 and through the upper end 38 of steam chamber 14 toward the bottom end 40 of steam chamber 14, but generally does not physically contact the bottom end 40, so that at least a small volume is present between the straw 13 and the bottom end 40 of steam chamber 14. Optionally, bottom end 40 of steam chamber 14 includes heater 41 incorporated therein. Heater 41 may be an inductive heater, an electric resistance heater, or other suitable heater.

Figure 7:
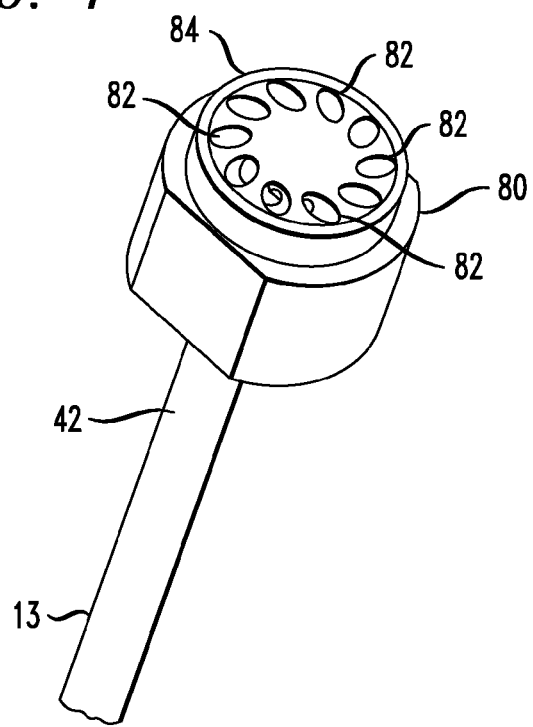
FIG. 7 shows a perspective view of an upper end of a fluid conduit use of the machine disclosed herein as depicted in FIG. 1.
Figure 7A:
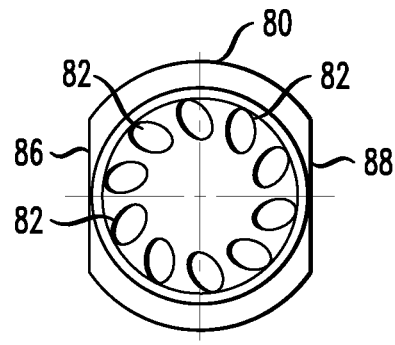
FIG. 7A shows a top plan view of the upper end of the fluid conduit of FIG. 7.
Figure 7B:
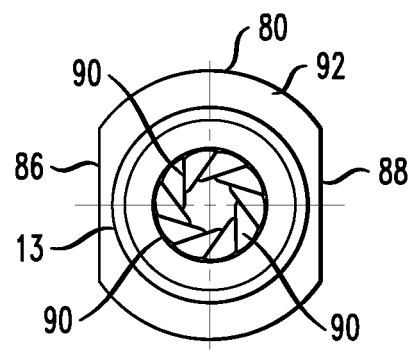
FIG. 7B shows a bottom plan view of the fluid conduit of FIG. 7.
Figure 7C:
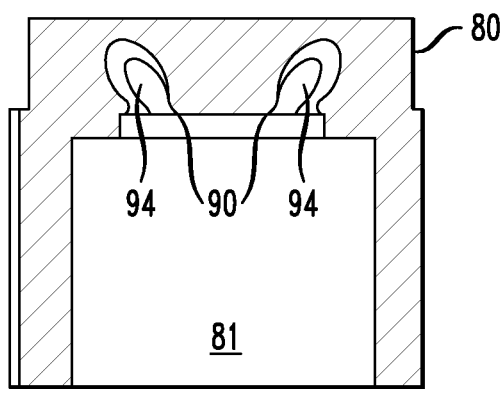
FIG. 7C shows a sectional view of the upper end of the fluid conduit of FIG. 7.

In an exemplary embodiment, top end 42 of straw 13 might include spray tip fitting 80, shown in FIGS. 5 and 7-7C through which fluid flowing through straw 13 passes prior to entering brew chamber 10. Spray tip fitting 80 includes recessed area 81 in which top end 42 of straw 13 is inserted.

As shown in FIGS. 7-7B, spray tip fitting 80 includes a plurality of outlet openings 82 extending radially around perimeter 84 thereof. In the exemplary embodiment shown FIG. 7, ten outlet openings 82 are shown, although those skilled in the art will recognize that more or less than ten passages can be used. Outlet openings 82 direct fluid flowing upward through straw 13 outwardly upon leaving spray tip fitting 80, thereby generating a tornado-like or vortex effect of the fluid, which serves several purposes. A first purpose is to help increase agitation of the fluid inside brew chamber 10, thereby increasing the growing efficiency of machine 17. Additionally, outlet openings 82 are configured to direct flow of a fluid exiting spray tip fitting 80 in an outward direction. The outward spraying of fluid directs the energy of the fluid along the sidewall of brew chamber 10 instead of directing the fluid straight upward, thereby reducing or eliminating the potential of the fluid to spill out of the top upper chamber 10.

As shown in FIGS. 7A and 7B, spray tip fitting 80 includes a pair of opposing, parallel flat surfaces 86, 88 that are used to seat spray tip fitting 80 into a complementary fitting 39 (shown FIG. 5) in upper end 38 of steam chamber 14. As shown FIG. 7B, spray tip fitting 80 also includes a plurality of inlets 90 formed in the bottom surface 92 of spray tip fitting 80. Each inlet 90 corresponds with one of outlet openings 82. Each passage 94 extends at an angle of about 38 degrees from vertical. Passages 94 provide fluid communication between each respective inlet 90 and corresponding outlet opening 82. For clarity, only two passages 94 are shown FIG. 7C.

During the brewing process, fluid enters spray tip fitting 80 through inlets 90 and is directed through passages 94 around perimeter 84 and through outlet openings 82 for discharge into brew chamber 10. After the brewing process is complete, the brewed fluid reverses flow into outlet openings 82, through passages 94 and out of inlets 90 and into straw 13 to steam chamber 14.

In an exemplary embodiment, bottom end 40 of steam chamber 14 might be vertically recessed with a taper to allow bottom and 44 of straw 13 to extend into, but not contact, the bottom end 40. Straw 13 extends through the upper end 38 of steam chamber 14 and to brew chamber 10 such that straw 13 provides fluid communication between steam chamber 14 and brew chamber 10.

The bottom end 40 of steam chamber 14 includes drain valve 15 that allows for draining of steam chamber 14, as well as for dispensing a brewed beverage from brew chamber 10 after the brewing process completes. Steam chamber 14 further includes vent valve 19 employed to vent steam chamber 14, allowing the brewed beverage to drain from steam chamber 14 through drain valve 15 and out of the machine 17 for dispensing. In an exemplary embodiment, vent valve 19 is operatively coupled to microprocessor-controller 6 so that vent valve 19 may be opened at the end of the brewing, cycle without requiring manual input from an operator (barista).

Referring back to FIG. 1, steam inlet 46 provides fluid communication between steam control valve 4 and steam chamber 14, and brewing water inlet 48 provides fluid communication between flow meter 5 and steam chamber 14. Cold water inlet 53 provides fluid communication between a cold water supply valve 55 and steam chamber 14. Steam inlet 46, brewing water inlet 48, and cold water inlet 53 all meet at a common inlet 57 that is in direct fluid communication with steam chamber 14. Optionally, vent valve 19 may be in fluid communication with common inlet 57.

Cold water inlet 53 provides a blast of cooling water directly from freshwater inlet 1 into steam chamber 14 in order to cool down any residual steam within steam chamber 14 after the brewing process. This cooling of the residual steam enhances a vacuum that is formed within steam chamber 14 that draws brewed fluid downward from brewing chamber 10 for dispensing.

Boiler 2 includes steam outlet 45 providing fluid communication between boiler 2 and steam control valve 4. Boiler 2 also includes heated water outlet 47 providing fluid communication between boiler 2 and water control valve 18. Boiler 2 further includes freshwater inlet conduit 49 providing fresh water to boiler 2 from freshwater inlet 1. Freshwater inlet conduit 49 includes tee 51 that diverts at least a portion of the freshwater around boiler 2 to heated water outlet 47 via cooling water mixer valve 3. The water from heated water outlet 47 and the steam from steam outlet 45 are introduced to brew vessel 9 to provide the brewing liquid and to brew the beverage.

Microprocessor-controller 6 is operatively coupled to heating element 50 in boiler 2 to control the heating/boiling of water from freshwater inlet 1 and present inside boiler 2. The water flows from freshwater inlet 1 to boiler 2. Freshwater inlet conduit 23 is in fluid communication with both boiler 2 and heated water outlet 47 (via cooling water mixer valve 3 and water control valve 18). Microprocessor-controller 6 is also operatively coupled to cooling water mixer valve 3, water control valve 18, and flowmeter 5 in order to control the flow and temperature of brewing water from boiler 2 into steam chamber 14 according to processes well known by those of ordinary skill in the art.

Additionally, microprocessor-controller 6 is operatively coupled to the steam control valve 4 in order to control the flow of steam from boiler 2 into steam chamber 14. Temperature sensor 7, located in the bottom end 22 of brew chamber 10, is operatively coupled to microprocessor-controller 6 to transmit temperature information inside brew chamber 10 to microprocessor-controller 6 so that microprocessor-controller 6 might regulate the temperature inside brew chamber 10 via steam control valve 4 and water control valve 18. Feedback from temperature sensor 7, as well as flowmeter 5, is used by microprocessor-controller 6 to regulate operation of cooling water mixer valve 3, steam control valve 4, and water control valve 18 to regulate the temperature of the brewing liquid inside brew vessel 9. Microprocessor-controller 6 is also operatively coupled to cold water valve 55 to regulate operation of cold water valve 55.

Microprocessor-controller 6 is also operatively coupled to user interface 8. A barista manipulates user interface 8 in order to instruct microprocessor-controller 6 of the process to brew a beverage in brew vessel 9 according to desired parameters, such as, for example, the volume of the beverage to be brewed, the final temperature of the brewed beverage, agitation of the brew, the duration of time that the beverage brews inside brew vessel 9, and other associated parameters. User interface 8 can be a touch sensitive display screen and allows a user to set brewing parameters, compile notes, and view other relevant information regarding machine 17 as well as personal preferences of particular customers. Further, user interface 8 can be used with microprocessor-control 6 to set parameters for each of a plurality of brew vessel 9 that make up machine 17. Through user interface 8, the user is also able to take notes on specific customers and orders as well as manage an order queue. Additionally, the user has the ability to override orders that are provided remotely.

In an exemplary embodiment, if a server (e.g. waiter, waitress) takes a plurality of beverage orders via a remote device and electronically transmits the orders to machine 17 via network communications port 16, microprocessor-controller 6 can prioritize the order in which the plurality of beverage orders are prepared based on brewing time, brewing quantity, and other such factors so that the order is ready for delivery to the customers with a minimum amount of waiting time and so that the beverages that are ordered are at or near a desired temperature.

In an exemplary embodiment, user interface 8 might include reader 52 that reads electronic information associated with a particular user. For example, reader 52 may be a card reader that is used to read an electronic card that is swiped through reader 52. Alternatively, reader 52 may be an RFID device that is used to wirelessly read an electronic device, such as a key fob, that is placed near reader 52 to extract information from the key fob regarding desired brewing parameters. Electronic information associated with a particular user may include, but is not limited to, the name of the user, the type of beverage that the user prefers, the preferred volume of beverage (i.e. 8 ounces, 12 ounces, 16 ounces), a temperature range of the beverage, quantity of creamer, and whether the user prefers any added flavoring, such as, for example, whipped cream and/or sugar.

Microprocessor-controller 6 is also operatively coupled to a network communications port 16. Network communications port 16 provides a communications path between microprocessor-controller 6 and an external location such as, for example, a host server, via a router, the Internet, or other device or system. Network communications port 16 allows customers of the coffee shop that owns machine 17 to directly communicate with machine 17 very complex orders that could not otherwise be communicated to a user due to complexity and length.

Referring to flowchart 800 in FIG. 8, in an exemplary operation of machine 17, a barista manipulates user interface 8 at step 802 in order to program microprocessor-controller 6 to brew a particular brewed beverage using machine 17. The user-specified brew parameters such as, but not limited to, brew temperature, brew time, brew volume, and brew agitation are input via the user interface 8 or remotely through network communications port 16. User interface 8 or network communications port 16 relays the brew parameters to microprocessor-controller 6, which further controls the valves 3, 4, 18, thereby achieving desired brew parameters and providing automation of the processes.

At step 804, machine 17 receives fresh water through the water inlet valve 1, which passes the fresh water into boiler 2. Optionally, a pump (not shown) may be used to pump water from boiler 2 to brew vessel 9. In an exemplary embodiment, however, the water may be supplied by a pressurized public water source. In another exemplary embodiment, the water may be supplied by a user-filled gravity fed water tank (not shown). Water in boiler 2 is heated to a temperature that is sufficient to generate the substantial pressure and temperature necessary to accomplish brew cycles. In an exemplary embodiment, boiler 2 may keep the water to between about 99° C. (about 210° F.) and about 132° C. (about 270° F.), with the pressure of between about 1 bar and about 2 bar. The heated water also creates steam pressure. At step 806, heated water from boiler 2 is piped to cooling water mixing valve 3 where the heated water subsequently cooled to a temperature slightly below the user's specified brew temperature by additional water supplied through freshwater inlet 1 that bypasses boiler 2 via (bypass) tee 51. At step 808, the user-specified volume and temperature of water flows out of boiler 2 and through mixing valve 3, where the water is injected into steam chamber 14 through brewing water inlet 48 via input water control valve 18. The accuracy of this process at step 808 might be achieved by a control loop between microprocessor-controller 6, flow meter 5, temperature sensor 7, and input water control valve 18.

At step 810, steam control valve 4, controlled via microprocessor-controller 6, opens, allowing the flow of high pressure steam into steam chamber 14 through steam inlet 46. Due to the high pressure in steam chamber 14, the water in steam chamber 14 is pushed up through straw 13, forcing open valve 62, thereby allowing the water to flow through filtering base 12 and into brew chamber 10. While the water is in brew chamber 10, the steam flow continues into steam chamber 14 and vents up straw 13, past valve 62, through filtering base 12, and into the water in brew chamber 10. The flow of steam into steam chamber 14 and its continued flow through straw 13 into brew chamber 10, transfers heat to and agitates the water in brew chamber 10. At step 812, once the user-specified water temperature threshold is reached in brew chamber 10, as measured by the temperature sensor 7, microprocessor-controller 6 transmits a signal to steam control valve 4 to throttle back the supply of steam to steam chamber 14, allowing valve 62 to close, thereby preventing additional steam from entering brew chamber 10 so that a barista can remove lid 32 to add ground coffee or tea leaves or other solid flavor bases for mixing into the water of the brew chamber 10.

At step 814, after the solid flavor base is added to the brew chamber 10, the barista initiates the start of the prescribed brew time at the user interface 8. During the brew time, steam is reintroduced to brew chamber 10 and the amount of steam flow to brew chamber 10, via steam chamber 14 and straw 13, is regulated by microprocessor-controller 6, which transmits electronic signals to operate steam control valve 4 in order to achieve the user's brew parameters, which are provided at user interface 8. At step 816, once the specified brew time is reached, microprocessor-controller 6 transmits a signal to close steam control valve 4, thus eliminating the flow of pressurized steam into the steam chamber 14. The condensing steam generates a pressure loss in steam chamber 14, thereby forming a vacuum that pulls the brewed beverage down through filtering base 12, thereby separating the solid flavor base from the beverage.

Optionally, in step 817, microprocessor-controller 6 may open cold water valve 55 to allow cold water from freshwater inlet 1 into steam chamber 14 in order to cool residual steam within steam chamber 14 and to generate a vacuum that draws the brewed beverage from brew chamber 10, thereby speeding up the extraction time of brewed beverage from machine 17 and generates a higher extraction pressure. The addition of the cold water also allows the barista of machine 17 to maintain a more precise temperature in brew chamber 10.

The brewed beverage flows down through straw 13 and into steam chamber 14. At step 818, once the majority of the brewed beverage has reached steam chamber 14, the brew vessel's vent valve 19 opens electronically via an electronic signal transmitted from microprocessor-control 6 and the brew vessel drain valve 15 is manually opened by the barista, allowing the beverage to drain into a cup (not shown) below. As the beverage is draining into the cup below, at step 820, the barista pulls plunger 11 with the spent grounds atop, up and out of brew chamber 10 further clearing brew chamber 10 of the spent flavor base. The barista rinses out plunger 11 with tap water and clears it of any flavor base debris. At step 822, once the beverage has emptied from steam chamber 14 into the cup, the barista places lid 32 on top of brew chamber 10, pulls up plunger 11 so that filtering base 12 is at the top end 21 of brew chamber 10, and flushes brewing vessel 9 with a blast of hot water from boiler 2. The water from the flush cycle is allowed to drain out the bottom of steam chamber 14 through drain valve 15 and into the machine's drain board 20 (shown in FIG. 2) and out the machine's drain tube (not shown). Upon completion of the rinse cycle, the barista replaces plunger 11 into brew chamber 10 and brew vessel 9 is ready to begin another brew cycle.

Figure 9:
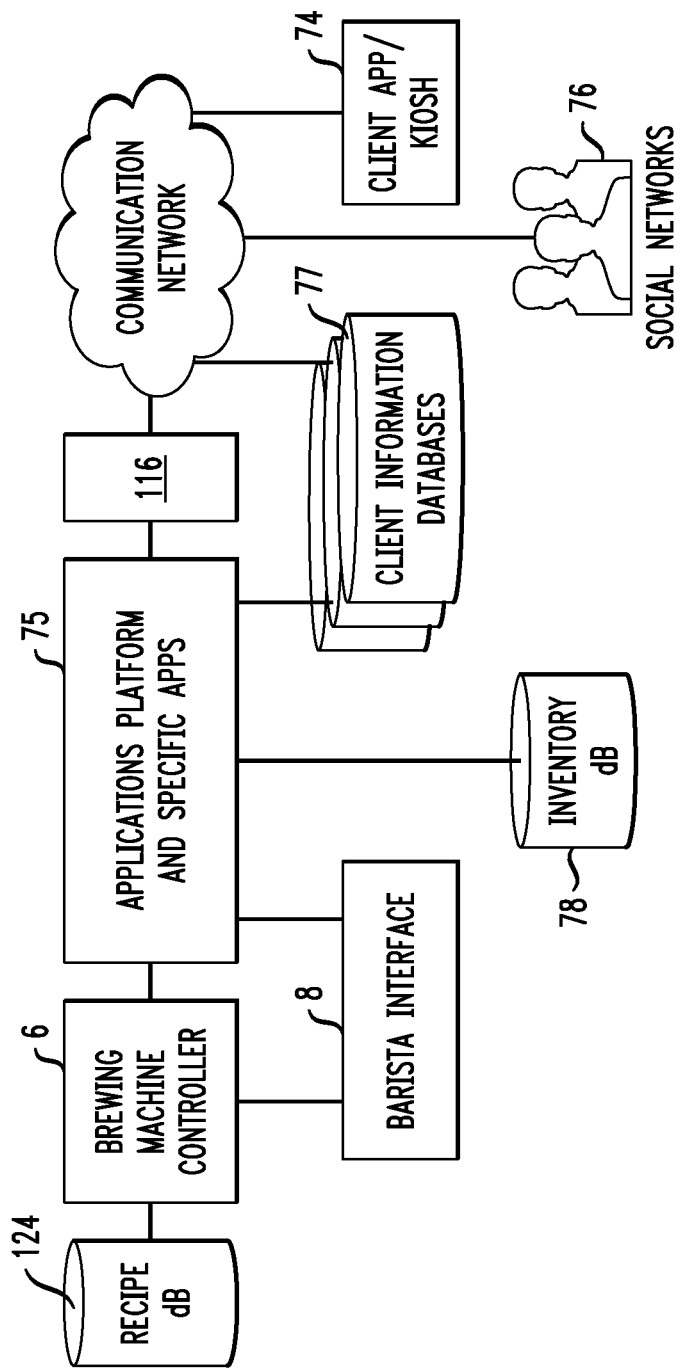
FIG. 9 shows an exemplary schematic view of a network system architecture for use with the machine shown in FIGS. 1-7C.

Referring to FIG. 9 and the flowcharts 1000 and 1100 of FIGS. 10 and 11, respectively, network communications port 16 may be used by customers to order a beverage remotely. For example, the customer will be able to electronically specify a beverage order through a client software application platform 75 that may reside on a client mobile device or can be offered through a customer application 74, such as a web portal or an in-store kiosk. The order may include a specification for the brewing parameters for the beverage as well as other order parameters, including pickup time, location, and reserved seating in the coffee shop where the beverage is being brewed. Furthermore, in step 1014, the customer may opt in to electronically receive special recommendations, including new coffee/tea flavors or brewing options and special promotions and other menu items. Such information can be generated by microprocessor-controller 6 and transmitted from network communications port 16.

Using customer application 74, in step 1102, a customer can remotely electronically order a beverage from a store using machine 17. In an exemplary embodiment, the order is made electronically via a wireless device, such as, for example a cell phone or other handheld device. Still further, in step 1002, the receipt of the electronic order and brewing of the beverage can be performed without human intervention via network communications port 16 to receive the order and microprocessor-controller 6 to manipulate operation of machine 17 to brew the beverage.

In step 1004, microprocessor-controller 6 can electronically determine when the customer is scheduled to be at the location. For example, in step 1006, such a remote order can be a time or calendar driven recurring order. For example, a customer can specify in customer application 74 that he/she would like his/her brewed beverage to be ready every Monday-Friday at 7:30 AM. Based on the anticipated pick-up time, microprocessor-controller 6 can determine an optimum time for beginning to brew the beverage so that the beverage is ready for the customer when the customer arrives at the store. Alternatively or in addition, in step 1008, customer application 74 can also be distance-driven if the customer has a GPS-enabled mobile device. If, for example, the customer is running late or is stuck in traffic, customer application 74 can wait to transmit in order to network communications port 16 until the customer is within a predetermined distance of the store. Based on the distance, in step 1010, microprocessor-controller 6 can determine approximately how long it will take for the customer to arrive at the store to pick up the beverage and in step 1104, can determine an optimum time for beginning to brew the beverage so that, in step 1012, the beverage is brewed and is ready for the customer when the customer arrives at the store.

Additionally, if the customer has a GPS-enabled mobile device, if network communications port 16 receives a signal from the GPS-enabled mobile device that the customer is traveling in a direction away from the store, network communications port 16 can transmit a signal to the GPS-enabled mobile device informing, the customer of the location of another store that uses machine 17 and request whether the customer would like his/her brewed beverage to be prepared at the other store. If so, network communications port 16 can transmit a signal to microprocessor-controller 6 to generate an order to brew the customer's beverage so that the beverage is prepared to coincide with the customer's approximate arrival time at the other store.

Optionally, in step 1016, prior to preparing the customer's brewed beverage, network communications port 16 can transmit a signal to the customer's GPS-enabled mobile device asking the customer if the customer would like to modify his/her standard order, would like any additional food to go along with his/her order, or order a beverage for a passenger in the customer's vehicle.

Microprocessor-controller 6 may include a queuing and queue optimization schedule that allows for the prioritization of orders that enable better utilization of machine 17 or shorten the wait time for customers. Microprocessor-controller 6 can be programmed to electronically prioritize orders received both via user interface 8 and network communications port 16 in order to efficiently brew beverages based on the number of vessels 9 associated with machine 17 as well as parameters such as, for example, brew times, customer location (in the store or in transit), multiple orders from the same customer or customer seated at the same table.

Additionally, microprocessor-controller 6 can modify brew time/temperature based on various factors. For example, machine 17 may include temperature measuring device (i.e. thermocouple) 120 and/or hygrometer 122 electronically coupled to microprocessor-controller 6 to measure room temperature and/or humidity, respectively. Based on the measured room temperature in step 1106 and/or humidity in step 1108, microprocessor-controller 6 adjusts brewing time/temperature accordingly. For example, for brewing in a room with relatively high humidity, microprocessor-control 6 can lengthen/shorten the brewing cycle. [With a higher humidity, would the system lengthen or shorten the brewing cycle?]

Additionally, the barista can use user interface 8 to input the type and amount of flavor base that is being used in machine 17. Based on the type and amount of flavor base in step 1110, microprocessor-controller 6 can adjust brewing parameters to optimize brewing of the flavor base. For example, if the barista inputs into user interface 8 that the flavor base is a particular flavor and amount of tea, user interface 8 transmits this information to microprocessor-controller 6, which then adjusts the temperature at a time of machine 17 to optimize brewing of the flavor base, which can be different than if the flavor base is a particular flavor and amount of a coffee bean. Further, the barista can input into user interface 8 the size of the grind of the flavor base so that, if the flavor base has a relatively coarse grind, in step 1112, microprocessor-controller 6 can adjust machine 17 to increase the brew time and conversely, if the flavor base has a relatively fine grind, microprocessor-controller 6 can adjust machine 17 to decrease the brew time.

Additionally, microprocessor-controller 6 can store a plurality of brewed beverage recipes in a recipe database 124 and wirelessly provide the recipes to a customer device (not shown) via network communications port 16. Each recipe can be modified on a per-brew basis. For example, a barista may input a change to recipe via user interface 8, which transmits the recipe change to microprocessor-controller 6, which alters the brewing cycle for this particular brew accordingly. Alternatively, network communications port 16 can electronically transmit a message to the customer if the recipe modification is provided from a customer via network communications port 16, microprocessor-controller 6 can display the modification on user interface 8 so that the barista can see what the recipe modification is.

The modifications may be menu-driven or, alternatively, a customer may be able to free-text recipe modifications from customer application 74 according to the customer's desires. For example, a particular recipe modification may call for a substitution of soymilk for regular milk. The customer may be able to access a "modifications" button (not shown) associated with each recipe which, when clicked, allows the customer to modify the recipe. After the customer modifies the recipe or the order (in step 1016), the customer can electronically upload modification so that, in step 1018, machine 17 receives the electronic modification via network communications port 16.

In step 1020, microprocessor-controller 6 can transmit a signal to the user interface 8 to alert the barista to use soymilk instead of regular milk. Alternatively, in step 1022 as well as steps 1114 and 1116, if machine 17 has the capability of combining, all of the brewed beverage ingredients and dispensing a totally finished brewed beverage products in a cup, microprocessor-controller 6 can transmit a signal for the substitution throughout machine 17 so that the soymilk is automatically substituted for regular milk.

Network communications port 16 allows for input to microprocessor-controller 6 via an alternative location other than user interface 8. For example, a customer may be able to place an order for a brewed beverage via network communications port 16 so that the beverage might be ordered and/or brewed before the customer physically arrives at the brewing location. The customer can provide information regarding a desired brewing process (amount of flavor base, any type of additive such as sugar, lemon, etc., brewing temperature) for the customer's beverage. Microprocessor-controller 6 may be Internet enabled such that microprocessor-control 6 can receive/transmit information via network communications port 16 over a telecommunication network (the Internet, Wi-Fi, etc.)

Network communications port 16 might also allow for download of information to or from microprocessor-controller 6 to or from a remote location. Such information may include the number and types of brewing processes performed by machine 17, as well as customer information obtained via reader 52.

Further, a plurality of different recipes can be saved in microprocessor-controller 6 so that a particular recipe can be recalled when desired for a particular customer. Additionally, the customer can use his/her remote device (e.g. cell phone, wireless device, etc.) to provide a particular recipe or a modification of an existing recipe for his/her beverage.

Additionally, software-based application platform 75 provides various features that facilitate the introduction of new applications and promotions to support customer needs. Such changes may include billing and payment, location processing, geo fencing, customer profile processing updating, store location, log in security, customer and social network analytics, privacy protection mechanisms, opt-in mechanisms, social networking enablers, and other features that may be used by either a customer or barista to facilitate use of machine 17 to provide a brewed beverage to the customer. Such extended functionality provides the ability to generate a large set of useful applications, ranging from social networking games the special promotions and marketing campaigns.

By way of example, social network 76 can be operatively coupled to application platform 75 so that customers who have the same taste in beverages can connect with each other as well as share beverage recipes and favor locations to obtain such beverages. By incorporating into social network 76, application platform 75 can be used to match people with common interests and offer further value-added features. Further, application platform 75 can be used to sell merchandise to customers via information provided by the customers. For example, application platform 75 can be tied into inventory database 78 in the store that includes data regarding the types and number of cookies available for sale at the store.

Application platform 75 can provide advertisements or offer discount coupons to the customer to promote sales of the cookies. As the inventory database 78 tracks the number of a particular cookie remaining, application platform 75 can transmit electronic messages to client application 74 that informs customers about discounts for the cookie. If inventory database 78 indicates that all of a particular type of cookie has been sold, application platform 75 can select another type of cookie from inventory database 78 and start to advertise and/or offer coupons for that cookie type instead.

Customer information database 77 is operatively coupled to application platform 75 such that information provided by the customer via network communications port 16 is stored in database 77. Database 77 is a repository for all customer related information, including customer profile and preferences, customer history, information on social network 76, and analytical information related to trends.

In one implementation of the inventive system, user interface 8 may be bundled with both application platform 75 and microprocessor-controller 6 in a single unit. In an alternative implementation, application platform 75 can run on a separate server (not shown) that is located remotely and services a plurality of machines 17.

There are embodiments of the invention disclosed here with a plurality of microprocessors. In certain embodiments of the invention disclosed here, the microprocessor is connected to a network that allows multiple devices to set brew specifications and initiate brew processes. In certain embodiments, networking is wireless while in certain embodiments, networking is wired.

Certain embodiments of the inventions disclosed here reach the desired temperature much more quickly than a conventional siphon coffee maker does. Certain embodiments of the inventions disclosed here have much more precise temperature control than a conventional siphon coffee maker does. Typical embodiments can control the temperature within 0.5 degree centigrade. However, other embodiments of the invention have different precisions of temperature control. For non-limiting examples, there are embodiments of the invention in which the temperature is regulated within 1 degree centigrade, embodiments of the invention in which the temperature is regulated within 2 degrees centigrade and embodiments of the invention in which the temperature is regulated within 0.2 degree Centigrade.

Certain embodiments of the invention disclosed here allow more efficient cleaning and rinsing than a conventional siphon coffee maker. For example, it is estimated that brewing chamber 10 can be cleaned from a first brew and ready for a second brew in less than approximately 2 min. Certain embodiments of the invention disclosed here allow superior methods for separating spent coffee from brewing liquid compared with conventional siphon coffee makers.

Certain embodiments of the invention disclosed were allow customizable process automation. For non-limiting example, each cup of coffee or tea can be easily brewed to an individual customer's specifications via automation. Additionally, certain embodiments of the invention disclosed here are more suitable for office use and/or home use than conventional siphon coffee makers.

Certain embodiments of the inventions disclosed here are more suitable tbr high volume commercial use than conventional siphon coffee makers.

In another embodiment of this invention, some or all of the valves could be manually operated and its entire operation could be partially automated or incorporate no automation at all.

In yet another embodiment of this invention, the boiler could be heated by a means other than electricity and incorporate manual valves and operate entirely free of electricity.

In still another embodiment of this invention, the boiler can be omitted in an alternative heat source, such as, for example and induction burner (not shown), can be used. For embodiment of the present invention with an induction burner, such an induction burner could be incorporated into bottom end 40 of steam chamber 14.

Although specific embodiments described above are intended for brewing coffee, other extractions are possible. One non-limiting example is brewing of tea. However, other extractions into hot water are possible with embodiments of the invention disclosed here. Moreover, there are embodiments of the invention disclosed here intended for use extracting into a liquid other than water.

In still another embodiment of this invention, the brewing machine may be equipped with an auxiliary steam wand and or an auxiliary hot water spigot.

Certain embodiments of the invention disclosed here are a hot liquid extraction system including a vessel, a controllable steam and water source external from the vessel which heats the liquid of the vessel, a plunger assembly disposed within the vessel operable to filter and remove a solid from the brewed beverage, and a valve to dispense the filtered beverage from the base of the brew vessel.

Certain embodiments of the invention disclosed here are similar to a conventional siphon brewing system comprising a vessel, but including an external controllable steam and hot water source, valves operable to regulate water flow and steam into the brewing vessel, and a plunger operable to separate a brewed liquid from a flavor base and to remove a spent flavor base from the system.

Certain embodiments of the invention disclosed herein might possess an additional gas supply 98 (shown in FIG. 1) to steam chamber 14 that is in fluid communication with a gas supply of non-toxic liquids, such as, for example, food grade nitrogen and/or carbon dioxide, which can provide an additional and/or alternative source of agitation (potentially substituting for steam-based agitation) and/or heating or cooling for the heated liquid. In-line heater 99 may be used to heat the gas as the gas passes from gas supply 98 to steam chamber 14. Alternatively, instead of heating the gas, the gas may be cooler than the brewed liquid and be used to cool the brewed liquid prior to dispensing. The gas supply and the steam disclosed, herein can be generally referred to as an agitation fluid. Microprocessor-controller 6 is also operatively coupled to gas supply 98 to admit the gas into steam chamber 14 at the proper time during the brewing process.

Additionally, gas supply 98 can be used to not only agitate the brewing liquid, but also to increase the pressure within brewing chamber 10 in order to more quickly boil the brewing liquid, which can result in a shorter brewing time. Further, in order to further reduce brewing time, vacuum system 95 can be operatively coupled to steam chamber 14 to pump air out of steam chamber 14 after the brewing process to more quickly draw fluid from brewing chamber 10 down into steam chamber 14. Alternatively, or in addition to vacuum system 95, the cooling coil 97 can be inserted into steam chamber 14 such that, when brewing is completed in brewing chamber 10, a cooling fluid, such as cool air, cold water, or other suitable non-toxic cooling fluid can be pumped through cooling coil 97 to lower the temperature inside steam chamber 14, thereby reducing pressure inside steam chamber 14 and increasing the vacuum to draw the brewed beverage from brewing chamber then downward into steam chamber 14 and out drain valve 15 for dispensing.

While the aforementioned discussion has been limited to application the present invention as a hot beverage brewing system, those skilled in the art will recognize that the present invention can be used in other contexts. For example, an aspect of the invention that is a mobile phone or a web-based application can enable multiple users to communicate with the server that is connected to a machine in order to input a complex specification such as a pre-configuration into such machine. Some exemplary applications include customer applications such as primers, appliances, thermostats, security systems, intelligent vending machines, and audio systems, as well as industrial applications such as paint mixers and car assembly line configurations. Another distinct aspect of the present invention is the ability to embed a social network into the functionality of machine that uses of that machine (e.g. a printer or coffeemaker) can interact with one another through mobile and web-based applications.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two Of more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Aspects of the present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

Aspects of the present invention can be embodied in the form of methods and apparatuses for practicing those methods. The present invention can also be embodied in the form of program code embodied in tangible media, such as magnetic recording, media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

No claim element herein is to be construed under the provisions of 35 U.S.C. §112, sixth paragraph, unless the element is expressly recited using the phrase "means for" or "step for."

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of brewing a beverage comprising the steps of:
   (a) electronically receiving an order from a customer to brew a beverage at a location;
   (b) electronically determining when the customer is scheduled to be at the location;
   (c) timing the beginning of the brewing of the beverage so that the beverage is brewed within an approximate timeframe when the customer arrives at the location; and (d) brewing the beverage by a brewing device comprising:
   a brew chamber having a brew chamber upper end and a brew chamber lower end;
   a steam chamber disposed below the brew chamber, the steam chamber having a steam chamber upper end and a steam chamber lower end, the steam chamber lower end being in fluid communication with the brew chamber;
   a boiler having a steam outlet in fluid communication with the steam chamber and having a heated water outlet in fluid communication with the steam chamber;
   a fresh water supply conduit having a first leg coupled directly to the boiler and a second leg coupled to the heated water outlet; and
   a common inlet in fluid communication with the steam outlet, the heated water outlet, and the fresh water supply conduit, the common inlet providing an inlet from the steam outlet, the heated water outlet, and the fresh water supply conduit to the steam chamber.

2. The method according to claim 1, further comprising, after step (a) and before step (d), the step of electronically transmitting a message asking the customer would like to make a modification to the order.

3. The method according to claim 2, further comprising receiving an electronic response from the customer providing a modification to the order.

4. The method according to claim 3, further comprising the step of displaying the modification on a user interface.

5. The method according to claim 3, further comprising, after step (c), the step of automatically performing the modification.

6. The method according to claim 1, further comprising, before step (a), electronically providing a menu to the customer.

7. The method according to claim 1, wherein step (b) is determined by time.

8. The method according to claim 1, wherein step (b) is determined by a distance of the customer from the location.

9. The method according to claim 1, wherein the step of brewing the beverage comprises the steps of:
   removably inserting a filtering base into the brew chamber;
   providing a heated fluid into the brew chamber lower end;
   providing an agitation fluid into the brew chamber lower end, the agitation fluid forcing the heated fluid into the brew chamber upper end;
   providing the agitation fluid into the brew chamber upper end;
   adding a flavor base into the brew chamber upper end;
   combining the heated fluid with the flavor base, forming a brewed beverage; and
   dispensing the brewed beverage.

10. A method of brewing a beverage comprising the steps of:
   (a) electronically receiving an order to brew a beverage from a remote location;
   (b) electronically calculating a brew time;
   (c) adding a flavor base to a brewing device;
   (d) brewing the beverage by a brewing device comprising:
      a brew chamber having a brew chamber upper end and a brew chamber lower end;
      a steam chamber disposed below the brew chamber, the steam chamber having a steam chamber upper end and a steam chamber lower end, the steam chamber lower end being in fluid communication with the brew chamber;
      a boiler having a steam outlet in fluid communication with the steam chamber and having a heated water outlet in fluid communication with the steam chamber;
      a fresh water supply conduit having a first leg coupled directly to the boiler and a second leg coupled to the heated water outlet; and
      a common inlet in fluid communication with the steam outlet, the heated water outlet, and the fresh water supply conduit, the common inlet providing an inlet from the steam outlet, the heated water outlet, and the fresh water supply conduit to the steam chamber; and
   (e) dispensing the brewed beverage.

11. The method according to claim 10, wherein step (b) comprises measuring room temperature.

12. The method according to claim 10, wherein step (b) comprises measuring humidity.

13. The method according to claim 10, wherein step (b) comprises determining a type of the flavor base used to brew the beverage.

14. The method according to claim 10, wherein step (b) comprises determining an amount of the flavor base used to brew the beverage.

15. The method according to claim 10, wherein step (b) comprises determining a grain size of the flavor base used to brew the beverage.

16. The method according to claim 10, wherein steps (a)-(e) are performed without human intervention.

17. The method according to claim 10, wherein step (a) comprises a calendar driven recurring order.

18. The method according to claim 10, wherein the step of brewing the beverage comprises the steps of:
   removably inserting a filtering base into the brew chamber;
   providing a heated fluid into the brew chamber lower end;
   providing an agitation fluid into the brew chamber lower end, the agitation fluid forcing the heated fluid into the brew chamber upper end;
   providing the agitation fluid into the brew chamber upper end;
   adding a flavor base into the brew chamber upper end;
   combining the heated fluid with the flavor base, forming a brewed beverage; and
   dispensing the brewed beverage.

* * * * *